July 3, 1962 G. R. LITTLE 3,042,851
A.C. VOLTAGE REGULATING SYSTEM
Filed Sept. 3, 1957
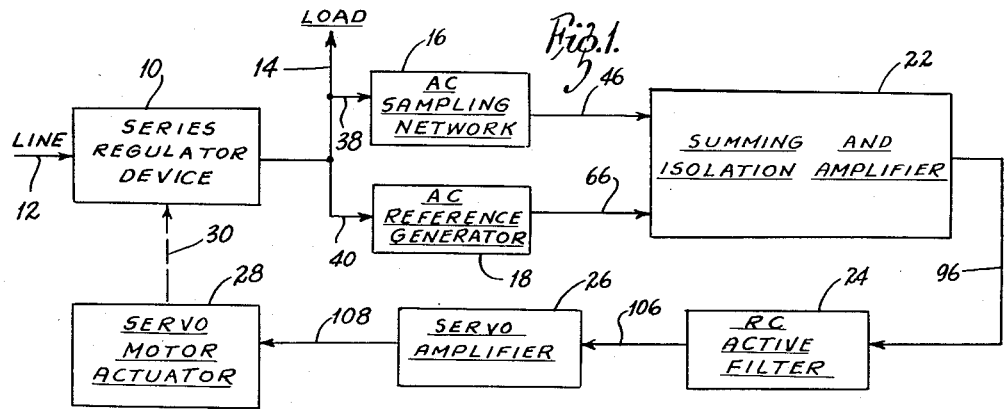
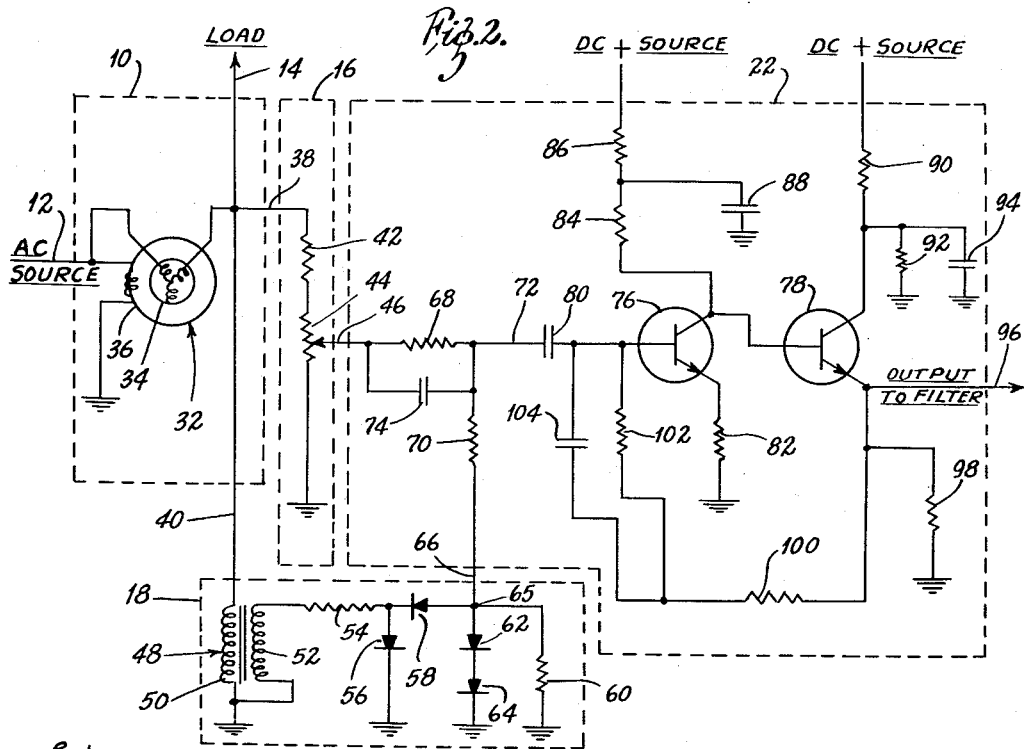
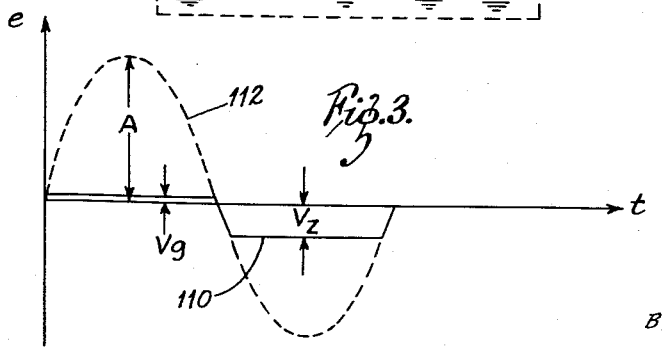
INVENTOR:
GERALD R. LITTLE,
BY Kingsland, Rogers & Ezell
ATTORNEYS

United States Patent Office 3,042,851
Patented July 3, 1962

3,042,851
A.C. VOLTAGE REGULATING SYSTEM
Gerald R. Little, St. Louis, Mo., assignor to The Emerson Electric Manufacturing Company, St. Louis, Mo., a corporation of Missouri
Filed Sept. 3, 1957, Ser. No. 681,527
5 Claims. (Cl. 323—51)

The present invention relates generally to voltage regulation in an A.C. power circuit. More particularly, it pertains to a novel voltage regulating system employing an A.C. reference generator.

The invention is directed to the problem of fluctuating line voltage which may result from variations in power consumed in interconnected circuits having a common power source. For example, in an airplane or like device, a power generator having an output of, say, 115 volts at 400 cycles per second may be employed to operate various power consuming circuits. Variations in the power consumed in one circuit will often be reflected as fluctuations in line voltage to other power consuming circuits, so that circuits which require close control of voltage must, of course, include special regulating means. Thus, it is a general object of the invention to provide a novel system of voltage regulation in an A.C. circuit.

The regulating system herein disclosed contemplates an arrangement in which line voltage can be delivered to a given load through a series regulator device of generally well known type, including a single coil rotor the position of which may be varied to effect changes in the voltage output. In other words, the input-output voltage ratio is different for each position of the rotor, whereby turning the rotor one way will increase the voltage ratio and turning it the other way will decrease the voltage ratio. Hence, it is another object of the invention to provide a novel system of voltage regulation which includes a positionable element for predeterminately varying an input-output voltage ratio.

Although the series regulator device provides the means for regulating the voltage received from the line and delivered to the load, there still remains the necessity for ascertaining the required direction and extent of movement of the rotor in accordance with fluctuations in the line voltage. In solution of this latter problem, the invention makes use of a constant reference voltage generated by novel means to be described hereinafter. It is another object of the invention, therefore, to provide a novel reference voltage generator for an A.C. regulator.

The constant reference voltage, along with a sample of the actual voltage being delivered to the load is taken, and these two voltages are delivered for comparison in opposed phase relationship to a mixing network incorporated in a summing and isolation amplifier. The amplified resultant of the compared voltages is passed through an RC active filter to remove undesired harmonics and is then fed to a servo amplifier so as ultimately to drive a motor which is adapted to position the rotor of the previously mentioned series regulator device. It will be understood that the characteristics of the resultant from the compared voltages aforementioned are such as to determine both the direction and the extent of movement of the servo motor and, hence, of the rotor of the series regulator device. From this, it is obvious that it is another object of the invention to provide a novel system of voltage regulation which compares a constant voltage with a voltage subject to incipient fluctuation.

The invention contemplates the constant reference voltage generator being driven by the regulated load voltage, whereby the reference generator output will have negligible variation due to drive voltage variation. Hence, it is another object of the invention to provide a novel voltage regulating system in which a reference voltage generator is driven by the regulated voltage.

It should be noted that the sample of the voltage which is employed along with the reference voltage to determine the extent of regulation required is the regulated voltage itself, so that a continuous monitoring of the regulated voltage is maintained, rather than attempting to follow the relatively wide swings of the supply voltage. Therefore, it is another object of the invention to provide a novel system of voltage regulation which functions to monitor the regulated voltage.

The objects above-mentioned, along with additional advantages, will be apparent from the following description of a preferred embodiment of the invention as depicted in the accompanying drawings, in which:

FIGURE 1 is a diagramatic representation showing the arrangement and interconnection of components of the voltage regulating system of the present invention;

FIGURE 2 is a schematic representation showing the electrical hook-up of the series regulator device, the load sampling network, the reference generator, and the summing and isolation amplifier; and FIGURE 3 is a graphic representation illustrating the output of the reference generator.

Directing more particular attention to the block diagram of FIGURE 1, a series regulator device 10 is connected to a line 12 for power input and delivers a regulated output voltage, not only to a load line 14, but also to both a sampling network 16 and a reference generator 18. Both the sampling network 16 and the reference generator 18 deliver output individually to a summing and isolation amplifier 22. The output of the amplifier 22 is passed through an RC active filter 24 for attenuation of unwanted frequencies, then further amplified in a servo amplifier 26, finally to be delivered to a servo motor actuator 28. The actuator 28 is connected mechanically to the series regulator device 10 to effect a desired regulation of voltage.

Inasmuch as certain of the components above mentioned are wholly conventional, it is not deemed necessary to set forth the details of all of the electrical hook-ups involved. Thus, it will be understood that the RC active filter 24, the servo amplifier 26, and the servo motor actuator 28, including the mechanical connection 30 of the latter with the series regulator device 10 are well known to those skilled in the art which is pertinent to the present invention. The novel electrical arrangement which precedes the RC active filter 24, however, is illustrated in detail in FIGURE 2, the individual components being separately defined by broken lines and designated by the same numerals employed in FIGURE 1.

Directing attention to FIGURE 2, then, the series regulator device 10 comprises an induction potentiometer 32 which may well take the form of a conventional synchro transmitter having a Y-connected multicoil stator 34 and a single coil rotor 36. The stator 34 is connected in series between the line 12 and the load 14, one coil being open-terminated as clearly illustrated in FIGURE 2. The rotor 36 is connected between the line 12 and ground. The output of the device 32, connected to the load line 14, is connected also, by means of respective leads 38 and 40 to the sampling network 16 and the reference generator 18.

The sampling network 16 takes the form of a voltage divider comprising a fixed resistor 42 and a potentiometer 44 connected in series between the lead 38 and ground. The output of the sampling network is, of course, taken off at the potentiometer 44 and delivered by a lead 46 to a mixing network forming part of the summing amplifier 22.

The reference generator 18, illustrated in FIGURE 2, includes a transformer 48 having a primary coil 50 connected between the lead 40 and ground. A secondary coil 52 of the transformer 48 has one end also connected to ground, and the other end connected to a current limiting resistor 54. The opposite end of the resistor 54 is joined both to a rectifying diode 56 connected and oriented to pass current to ground and to a rectifying diode 58 connected through a resistor 60 to ground and oriented to pass current to the resistor 54. A pair of diodes 62 and 64 of the direct voltage reference type, known in the art as "Zener diodes," are connected in series between ground and a junction point 65 intermediate the aforementioned diode rectifier 58 and resistor 60. The Zener diodes 62 and 64 are oriented to pass current to ground. A lead 66, also connected to the junction 65, serves to deliver the output of the reference generator 18 to the summing amplifier 22.

The amplifier 22 includes a summing resistor 68 connected to the lead 46 and a summing resistor 70 connected to the lead 66. The opposite ends of the resistors 68 and 70 are brought together at a lead 72, this junction being also connected through a phasing capacitor 74 back to the lead 46.

In addition to the summing arrangement above described, the amplifier 22 illustrated in FIGURE 2 includes a pair of NPN transistors 76 and 78. The transistor 76, connected in common emitter arrangement, has its base terminal connected to the lead 72 through a D.C. voltage blocking capacitor 80. The emitter of the transistor 76 is connected to ground through a degenerative resistor 82, while the collector of this transistor is connected through voltage dropping biasing resistors 84 and 86 to an appropriate D.C. voltage source. A decoupling capacitor 88 is connected between ground and the junction of the resistors 84 and 86. The collector of the transistor 76 is also connected for input to the base of the transistor 78. The latter transistor has its collector connected through a bias resistor 90 to an appropriate D.C. voltage source, and also through both a bias resistor 92 and a bypass condenser 94 to ground. The resistor 92 cooperates with the resistor 90 to provide a voltage dividing function and co-operates with the condenser 94 to provide a decoupling function.

The transistor 78, connected in emitter follower arrangement, delivers output from its emitter to a lead 96 connected to the RC active filter 24. The emitter of the transistor 78 is also connected to ground through a load impedance 98 and has still further connection through a feedback resistor 100 and a bias resistor 102 to the base of the transistor 76. A bypass condenser 104 parallels the bias resistor 102.

Referring back to FIGURE 1 of the drawing, the intelligence delivered by the lead 96 to the filter 24 is conveyed by a connection 106 to the servo amplifier 26, thence by a connection 108 to the servo motor actuator 28.

*Operation*

As previously indicated, the principal novelty of the present invention resides in the electrical arrangement which enables production of a resultant voltage, or error signal, which is proportional to the need for voltage adjustment. The desired resultant, developed in the circuits illustrated in FIGURE 2, is derived by comparison of the regulated voltage with a constant voltage to provide an algebraic of these voltages which can be employed in conventional manner to position the movable rotor 36 of the series regulator device 10. The ability of the device 10 to vary the voltage ratio between input and output in accordance with the position of the rotor 36 is well known and need not be described in detail here.

Directing attention to the reference generator 18, the regulated voltage at the output of the device 10 is fed into the primary 50 of the transformer 48. The transformer 48 may have a one-to-one ratio and is provided primarily to effect a 180° phase reversal of the input voltage. Inasmuch as one end of each of these transformer windings is grounded, the output of the secondary 52 will obviously vary between ground potential and the peak negative value of the load voltage, the negative peaks of the secondary 52 corresponding in time relation to the positive peaks of the load voltage which appears in the primary 50.

The sinusoidal output of the transformer 48 passes through the current limiting resistor 54 to be fed into a diode network which converts it to a square wave characteristic. Referring to FIGURE 2, a path is provided through the diode rectifier 56 to ground, the diode 56 being so oriented as to provide low impedance on the positive swing of the output. Another path to ground is provided by way of the diode rectifier 58 and the resistance 60, but the diode 58 is oriented to provide a high impedance for the positive output. It may be mentioned here that the resistance 60 is employed, and its value chosen, to insure the positive output at the junction point 65 remaining below a predetermined maximum level.

The Zener diodes connecting the junction 65 to ground are arranged to provide a low impedance path to ground for a positive voltage, but a relatively high impedance for the negative voltage output of the reference generator transformer 48. In accordance with the well understood action of Zener diodes, however, this latter statement must be qualified to the extent that the high impedance is effective only up to a predetermined negative voltage level. For example, each of the Zener diodes may accommodate a reverse potential up to, say, eight volts, which is called its Zener voltage. The two Zener diodes connected in series, then, can accommodate, say, sixteen volts of negative potential in the reverse direction before a low impedance characteristic will become effective. Thus, these Zener diodes serve, in effect, to clamp the negative swing of potential at a predetermined maximum level, such as sixteen volts, and since the output of the reference generator 18 is taken from the junction point 65, it is clear that the output of the generator 18 takes the form of a recurrent or pulsating negative voltage of substantially constant amplitude. The pulsations result, of course, from the positive alternation being blocked from the junction 65 by the diode 58 and simultaneously grounded through the diode 56, whereas the negative alternation is retained in part through the above-described characteristics of the Zener diodes. Since the Zener diodes 62 and 64 are effective to maintain a constant voltage, as long as the alternation to which they pertain is at or above the Zener voltage, the negative pulsation will have a flat horizontal characteristic, and the result will be a substantially square wave form.

The full line curve 110 of FIGURE 3 illustrates graphically the output of the reference generator 18 as it appears at the junction 65. In this illustration, the $V_g$ indicates, in exaggeration, the very slight positive potential which does appear during the positive alternation, it being understood that the value of $V_g$ will normally be at substantially ground potential. $V_z$ represents the value of Zener voltage which constitutes the desired constant output potential of the generator 18. The broken line curve 112 of sine wave form having peak amplitude A represents the output of the transformer 48. The obvious correspondence between the waves 110 and 112 of FIGURE 3 indicates clearly that the greater the peak amplitude of the input wave 112, the more nearly will the output wave 110 approach a square form, which is desirable in order to simplify the later filtering out of unwanted harmonics. It is equally obvious, however, that the amplitude of the square wave voltage $V_z$ is quite insensitive to variations in the amplitude of the voltage curve A.

The substantially square constant voltage wave output of the reference generator 18 is fed to the summing and isolation amplifier 22 for comparison with a sample of the regulated voltage being actually supplied to the load through the lead 14. The sample voltage is taken by means of the voltage divider 42, 44 and is, of course, substantially 180° out of phase with the reference generator voltage. The sample voltage and the reference voltage are passed through respective summing resistors 68 and 70 to a common junction, the phasing capacitor 74 being normally required to trim out inadvertent phase shifts so that the voltages may be in direct phase opposition. The algebraic sum of the two voltages is delivered for direct amplification through the blocking capacitor 80 to the transistor 76.

The amplifier 22 employs the transistor 76 in common emitter arrangement for voltage gain. The resistance 82 is provided for degenerative effect in the emitter circuit. The output of the transistor 76 is delivered to the transistor 78 connected in emitter follower arrangement which, although providing no voltage gain, does provide isolation which prevents loading the preceding stage. Degenerative feedback from the output of the transistor 78 is effected by virtue of the resistance 100 connected back through the bias resistor 102 and by-pass condenser 104 to the input side of the transistor 76.

The amplifier resultant constituting the output of the summing amplifier 22 is, as previously mentioned, delivered to the RC active filter for elimination of harmonic frequencies other than the primary frequency of the line voltage. Inasmuch as this method of eliminating unwanted harmonics is generally well known in the art, it is not deemed necessary here to provide a detailed description of the filter 24. This applies also to the functional operation of the servo amplifier 26 and the servo motor actuator 28, both being well known in the art, as is also the mechanical connection of the motor actuator 28 to a synchro transmitter of the type here employed as the series regulator device 10.

Clearly, there has been provided a voltage regulating system which fulfills the objects and advantages sought therefor.

It is to be understood that the foregoing description and the accompanying drawing have been given by way of illustration and example. It is further to be understood that changes in the form of the elements, rearrangement of parts, and the substitution of equivalent elements, all of which will be apparent to those skilled in the art, are contemplated as being within the scope of the present invention, which is limited only by the claims which follow.

What is claimed is:

1. In a voltage regulating system, in combination, mechanically movable means for regulating an A.C. voltage, means for sampling the regulated voltage, means employing the regulated voltage as input for generating a constant reference voltage, and means for comparing the sampled voltage with the constant reference voltage and utilizing the resultant to effect movement of the mechanically movable regulating means, the reference voltage generating means comprising means for producing an output reference voltage of substantially square form, and the voltage comparing and utilizing means including a summing amplifier for amplifying the resultant voltage followed by filter means for eliminating unwanted frequencies in the amplified resultant voltage.

2. The combination of claim 1 wherein the summing amplifier comprises a first transistor stage in grounded emitter connection for voltage gain and a second transistor stage in emitter follower connection for current gain.

3. A reference voltage generator comprising, in combination, an input terminal and an output terminal, electrical conducting means including an impedance element connected in series between said terminals, a rectifier connected in series between the impedance element and the output terminal and oriented to block current flow to the latter, another rectifier connected from ground to a point between the resistance element and the first-mentioned rectifier, and a direct voltage reference diode connected between said output terminal and ground and oriented to pass current at all voltage magnitudes to ground.

4. The combination of claim 3 with the addition of a second impedance element connected between the output terminal and ground.

5. The combination of claim 1 wherein the summing amplifier includes a summing resistor for the sample voltage and a summing resistor for the reference voltage, said resistors being connected to a common junction, and a phasing capacitor connected in parallel with one of said resistors.

References Cited in the file of this patent

UNITED STATES PATENTS

| | | |
|---|---|---|
| 2,504,017 | George et al. | Apr. 11, 1950 |
| 2,529,111 | Steinberger | Nov. 7, 1950 |
| 2,563,179 | Malsbary | Aug. 7, 1951 |
| 2,615,936 | Glass | Oct. 28, 1952 |
| 2,619,630 | Stone | Nov. 25, 1952 |
| 2,668,272 | Groth | Feb. 2, 1954 |
| 2,714,702 | Shockley | Aug. 2, 1955 |
| 2,763,959 | Welch | Sept. 11, 1956 |
| 2,864,978 | Frank | Dec. 16, 1958 |
| 2,913,657 | Erikson | Nov. 17, 1959 |

FOREIGN PATENTS

| | | |
|---|---|---|
| 332,206 | Italy | Nov. 26, 1935 |